United States Patent [19]

Giordano et al.

[11] Patent Number: 5,159,602
[45] Date of Patent: Oct. 27, 1992

[54] METHOD OF AND APPARATUS FOR PROVIDING A HIGH POWERED ULTRAVIOLET LASER BEAM WITH HIGH REPETITION FREQUENCY

[75] Inventors: Gianfranco Giordano, Rome; Giovanni Matone, Grottaferrata, both of Italy

[73] Assignee: Istituto Nazionale Di Fisica Nucleare, Frascati, Italy

[21] Appl. No.: 714,007

[22] Filed: Jun. 5, 1991

[30] Foreign Application Priority Data

Jul. 25, 1990 [IT] Italy ................. 48164 A/90

[51] Int. Cl.$^5$ ................................ H01S 3/10
[52] U.S. Cl. ...................... 371/22.1; 372/21; 372/94; 372/100
[58] Field of Search ............... 372/94, 92, 22, 21, 372/100

[56] References Cited

U.S. PATENT DOCUMENTS 3,947,688  3/1976  Massey .................. 372/22

Primary Examiner—Leon Scott, Jr.
Attorney, Agent, or Firm—Thomas R. Vigil

[57] ABSTRACT

A method of and an apparatus for providing an ultraviolet laser beam are defined. The system doubles the frequency of an infrared laser beam provided by a commercially available infrared laser, for instance a Nd-Yag laser mode-locked at 100 MHz, in a first non-linear crystal and accumulates the obtained green laser beam into a storage ring cavity to obtain high power in the visible range, and then doubles the frequency of the green laser beam in a second non-linear crystal to receive an ultraviolet laser beam at 2600 A. The power levels at the latter wavelength are much higher than those of commercially available continuous wave lasers.

9 Claims, 2 Drawing Sheets

METHOD OF AND APPARATUS FOR PROVIDING A HIGH POWERED ULTRAVIOLET LASER BEAM WITH HIGH REPETITION FREQUENCY

BACKGROUND OF THE INVENTION

1. Field of the Invention

The present invention relates to an ultraviolet laser beam and, more in particular, a method of and an apparatus for providing a high powered ultraviolet laser beam. The invention can be used in a number of industrial applications from the book industry to the production of printed cards and in the medical treatments as well.

2. Description of the related art including information disclosed under 37 CFR §§12.97–1.99.

It is known that lasers commercially available in the wavelength range lower than 300 nm are essentially of four types:

(a) excimer lasers with powers up to a hundred of watts but at very low repetition frequency (up to some hundreds of Hz);

(b) dye lasers which can be operated both in continuous wave mode and in pulsed mode (some Hz), powers of some hundreds of milliwatts being provided in the first case, and some in the second case;

(c) gas lasers operating only in continuous wave mode and with very low powers of the order of one hundred of milliwatts;

(d) solid state lasers with doubling of frequency operating at high repetition frequency with powers lower than one watt.

SUMMARY OF THE INVENTION

The present invention is aiming at overcoming the limits of the commercially available lasers by providing a laser beam of 266 nm with a surprisingly high average power and at a frequency of 100 Mhz from a commercial infrared laser.

The doubling of the frequency of an infrared laser Nd-Yag laser as a result of two passages through a LiNbO$_3$ crystal has already been reported in the literature.

The inventive step at the base of the present invention is that the generally disclosed multi-passage geometry can be associated with a storage ring for photons in full analogy with the storage rings generally used for electrons and protons.

Thus the invention provides the conversion of the infrared light from a commercial infrared laser, for example a mode-locked Nd-Yag laser, into green light by doubling the frequency in a non-linear crystal placed within a ring cavity acting as storage ring for the green light.

The green light which has been generated propagates around the ring and is partially converted into UV-light in a second doubling crystal located in the cavity.

The residual green continues around the ring to the first doubler where, if the ring transit time matches exactly with the repetition frequency of the mode-locked infrared laser, it is coherently added to the green generated by the next IR (infrared) pulse.

It should be noted that the ring cavity allows advantageously:

(1) the efficiency of the infrared-green conversion to be enhanced as a result of the phase addition of the green generated in the first doubling crystal to the green previously generated and propagating in the cavity;

(2) green power levels not available with the conventional laser to be provided at the input of the second doubling crystal due to the storage process in the cavity;

BRIEF DESCRIPTION OF THE DRAWINGS

Further features and advantages of the invention will be apparent from the following detailed description with reference to the accompanying drawing showing by way of a non-limitative example a preferred embodiment. In the drawing.

DESCRIPTION OF THE PREFERRED EMBODIMENT(S)

Figure 1:
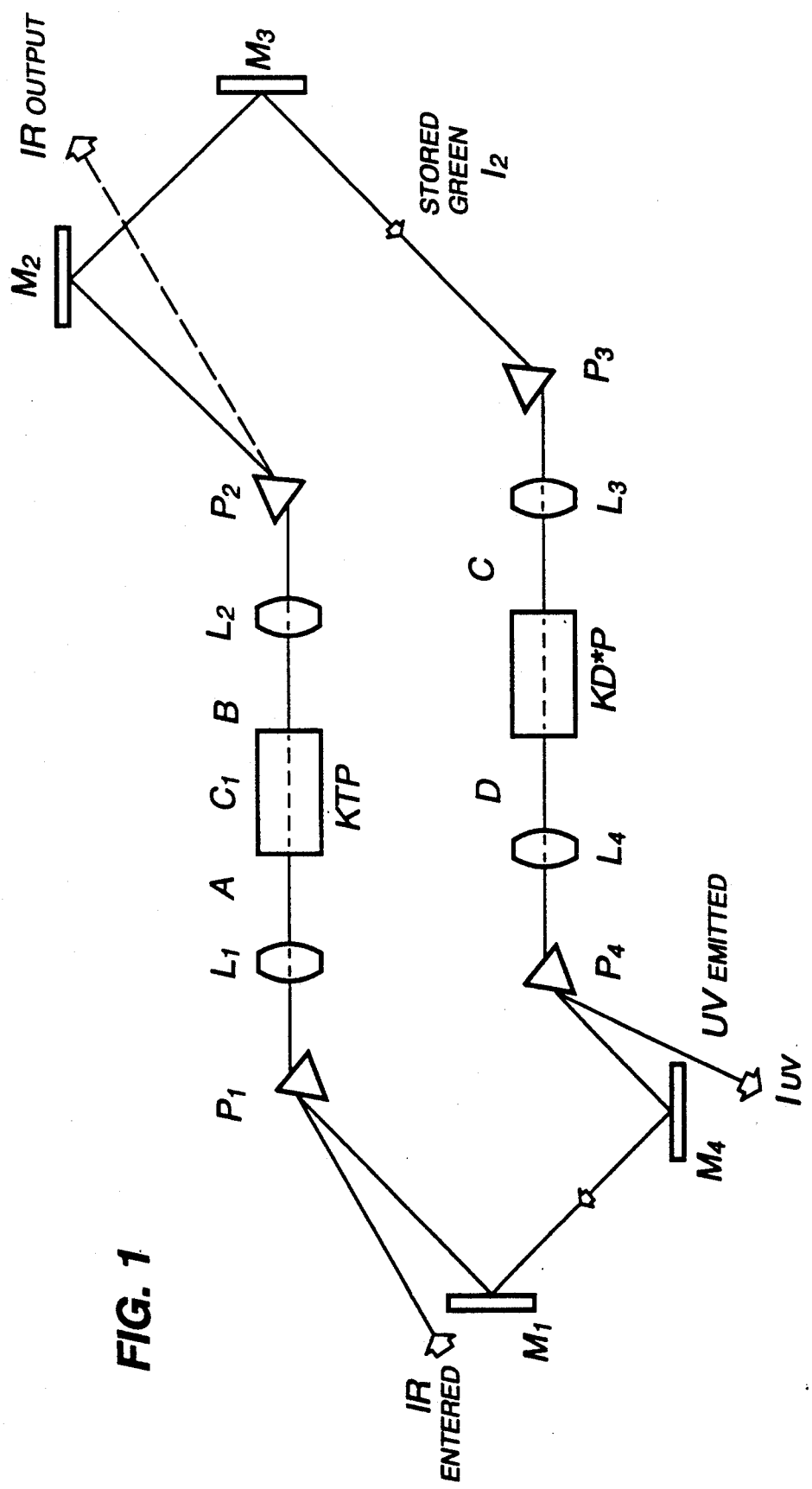
FIG. 1 is a block diagram of the laser system with the ring cavity.

With the reference to the Figures, the diagram of FIG. 1 shows an embodiment of the invention in which IR is the infrared light beam from a laser source of the commercial type, for example a mode-locked Nd-Yag laser with output power of 30 W.

$C_1$ is a non-linear crystal for the infrared-green doubling (for example KTP); $C_2$ is a non-linear crystal for the green-UV doubling (for example KD*P or $\beta$-BaB$_2$O$_4$); $M_1$, $M_2$, $M_3$, $M_4$, are mirrors reflecting totally the green; $L_1$, $L_2$, $L_3$, $L_4$ are lenses for focusing the green in both crystals $C_1$ and $C_2$ and stabilizing the cavity; $P_1$ is a prism used to superimpose along the same path the input infrared on the green propagating into the cavity; $P_2$ is a prism used for extracting from the cavity the infrared not converted by the first crystal $C_1$; $P_4$ is a prism used for extracting from the cavity the ultraviolet generated by the second crystal.

Let's now assume that the first infrared light pulse emitted by the laser to crystal $C_1$ has a density power $I_1$. At the output of crystal $C_1$, there will be a residual infrared pulse and a green pulse, the power of which will be determined by the conversion efficiency of crystal $C_1$ according to the expression:

$$\Sigma_1 = \tanh^2(Z_1 \sqrt{K_1} \cdot \bar{I}_1) \tag{1a}$$

where $Z_1$ is the length of the crystal and $K_1$ is a specific coefficient for the crystal.

The residual infrared pulse will leave the cavity after prism $P_2$, while the green pulse will reach crystal $C_2$ with power $I_c$.

Under the same conditions as for $C_1$ an UV-pulse will be supplied at the output of $C_2$ with power $I_{uv}$:

$$I_{uv} = \Sigma_2 \cdot I_c; \quad \Sigma_2 = \tanh^2(Z_2 \sqrt{K_2} \cdot \bar{I}_c) \tag{1b}$$

where $Z_2$ and $K_2$ are the same as for $C_1$ above.

This UV-pulse leaves the cavity after prism $P_4$, while the residual green pulse continues around the ring until crystal $C_1$ is reached with power I(A), wherein if the transit time (revolution) of the green in the ring is exactly the same as the repetition period of infrared pulses, the green pulse is introduced into crystal $C_1$ together with the second infrared pulse.

The conversion efficiency from infrared to green is now affected by the presence of the previously generated green.

Figures 2A, 2B:
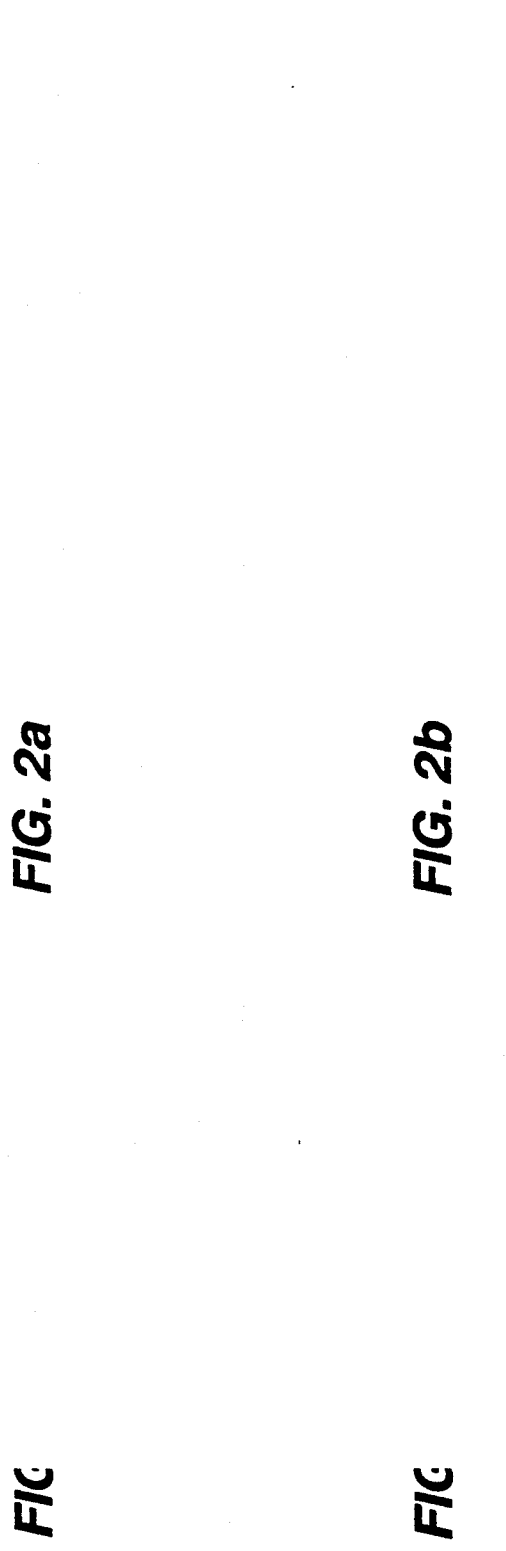
FIGS. 2a and 2b show the light compensation of KTP-crystal and the equivalent circuit with the auxiliary crystal of length $Z_x$.

Thus, as shown in FIGS. 2a and 2b, the condition that the infrared and the green are introduced at the same time into the crystal can be made similar to the condition of having an infrared pulse of power $I_{in}$ which is converted in a first crystal of length $Z_x$ such as to have at the output of the latter a residual infrared of power $I_1$ and a green of power $I(A)$ which are then introduced into the second crystal of length $Z_1$.

As one can see, it is as if a laser of density power $I_{in} = I + I(A)$, i.e. greater than that of the real laser, and a crystal of length $Z_x + Z_1$ were present. That is why a very high infrared-green conversion efficiency is obtained.

Therefore, when the equilibrium condition is reached after the pulse is passed through the cavity a sufficient number of times, the infrared is almost converted into green so that the power of the latter is considerably enhanced.

This will also cause the green-UV conversion efficiency to increase. In fact, the UV power leaving the cavity will be equal to the IR power entering the cavity less the residual IR diminished by the green power losses due to reflexion and absorption in the various optical elements of the cavity. As a whole, an IR-UV conversion efficiency of the order of 70% is obtained. Thus, if a commercial infrared mode-locked Nd-Yag laser having an output power of 30 W is used, the laser in accordance with the invention supplies a light at 266 nm with average power up to 20 W.

It should be appreciated that the combination of a multi-passage geometry with the optical ring cavity of the described apparatus is advantageous as any event causing a drop of the conversion efficiency in the single passage has a little impact on the power levels reached at the equilibrium. The less the instantaneous conversion efficiency, the more passages around the ring are required to reach about the same conversion efficiency at the equilibrium. For example, by reducing both $K_1$ and $K_2$ values in relationship (1) by a factor of 2, the UV-power at the equilibrium diminishes by approximately 13%. Accordingly, the number of passages necessary to reach the equilibrium varies from 6 to 11, which is always well within the limits imposed by the expected coherence time of the mode-locked Nd-Hag laser. Under these circumstances, the ring cavity shifts the burden of difficulties from maintaining a high single-passage conversion efficiency to controlling the beam quality and the optical path length. Although the latter is not trivial, it is far lens problematic.

Since unlike the known laser systems the laser of the invention provides an almost continuous wave UV beam having high average power, it has several applications both in the industrial and medical field. Among the most significant applications the following can be mentioned:

laser pantography wherein the UV laser is used to directly engrave the printed circuits on the semiconductor wafers, and wherein Nd-Yag lasers whose frequency is conventionally quadrupled are at present used;

laser lithography which is intensively used for printing in the book industry where Argon-lasers having longer wavelengths are used at present;

angioplastics permitting blood-clots in the arteries to be removed.

The high powered UV-laser of the present invention is an ideal instrument to the above purposes as the artery walls absorb UV-beams much less than the blood-clots.

The present invention has been described and illustrated according to a preferred embodiment. It should be understood, however, that many changes and modifications can be made by the skilled in the art without parting from the scope of the present industrial invention as claimed in the following claims.

We claim:

1. An apparatus for providing a high powered ultraviolet laser beam, said apparatus comprising:
   a conventional infrared laser source providing an infrared laser beam;
   a first non-linear crystal for doubling a frequency of said infrared laser beam to generate a green laser beam;
   an optical ring cavity means for storing said green laser beam, in which said first crystal is placed; and
   a second non-linear crystal placed in said ring cavity for converting said green laser beam into an ultraviolet laser beam.

2. The apparatus for providing an ultraviolet laser beam of claim 1, wherein said green laser, beam circulates in a path within said optical ring cavity means and wherein a first prism is placed in said optical ring cavity means upstream of said first crystal for superpositioning an input infrared laser beam from said conventional infrared laser source to said green laser beam circulating around said cavity means along the same path, and a second prism placed downstream of said first crystal for extracting from said ring cavity means the infrared laser beam not converted by said first crystal.

3. The apparatus for providing an ultraviolet laser beam of claim 2, wherein said green laser beam at the output of said second prism is reflected through a set of mirrors fully reflecting said green laser beam towards said second non-linear crystal.

4. The apparatus for providing an ultraviolet laser beam of claim 3, wherein a prism for extracting from said ring cavity means the ultraviolet laser beam generated by said second doubling crystal is placed downstream of said second doubling crystal.

5. The apparatus for providing an ultraviolet laser beam of claim 1 wherein said green laser beam circulates in a path within said optical ring cavity means and wherein means are provided for maintaining a revolution time, of said green laser beam around said ring cavity means equal to a repetition time of the light beam pulses from said infrared laser source which is arranged so that each green light beam pulse from the prism placed downstream of said second crystal enters said first crystal together with a second infrared light beam pulse.

6. A method for providing a high-powered ultraviolet laser beam, comprising the following steps:
   providing an infrared laser beam from a conventional infrared laser source;
   doubling a frequency of said infrared laser beam by means of a first non-linear crystal to generate a non-ultraviolet laser beam;
   accumulating said non-ultraviolet laser beam into a storage ring cavity means to obtain high power in the visible range; and
   doubling the frequency of said non-ultraviolet laser beam with a second non-linear crystal to generate an ultraviolet laser beam.

7. The method of providing a high powered ultraviolet laser beam of claim 6 further comprising the step of separating the ultraviolet laser beam from the non-ultraviolet laser beam and directing again the non ultraviolet laser beam to said first non-linear crystal.

8. The method of providing a high powered ultraviolet laser beam of claim 6 further comprising the step of maintaining a revolution time of a non-ultraviolet laser beam around said ring cavity means equal to a repetition time of the pulses of said conventional infrared laser source.

9. The method of claim 6 wherein said non-ultraviolet laser beam is a green laser beam.

* * * * *